(12) United States Patent
Darling

(10) Patent No.: US 7,222,977 B1
(45) Date of Patent: May 29, 2007

(54) LIGHT AND SOUND MIRROR ASSEMBLY WITH APPEARING CHARACTERS

(75) Inventor: Sandra M. Darling, Niceville, FL (US)

(73) Assignee: Blue Ridge International Products Company, Freeport, FL (US)

( * ) Notice: Subject to any disclaimer, the term of this patent is extended or adjusted under 35 U.S.C. 154(b) by 188 days.

(21) Appl. No.: 11/117,857

(22) Filed: Apr. 29, 2005

Related U.S. Application Data

(63) Continuation-in-part of application No. 10/412,649, filed on Apr. 10, 2003.

(60) Provisional application No. 60/371,329, filed on Apr. 10, 2002, provisional application No. 60/372,228, filed on Apr. 12, 2002, provisional application No. 60/567,101, filed on Apr. 30, 2004.

(51) Int. Cl.
*G02B 5/08* (2006.01)
*A63H 33/22* (2006.01)

(52) U.S. Cl. .................. 359/839; 359/871; 362/135; 446/219; 472/58

(58) Field of Classification Search ........... 359/839, 359/871; 472/58; 446/219
See application file for complete search history.

(56) References Cited

U.S. PATENT DOCUMENTS

| | | | |
|---|---|---|---|
| 3,973,834 A | 8/1976 | Penn et al. | |
| 4,712,892 A | 12/1987 | Masucci | |
| 4,902,118 A | 2/1990 | Harris | |
| 4,909,618 A | 3/1990 | Gardner | |
| 4,922,384 A * | 5/1990 | Torrence | 362/611 |
| 4,973,286 A | 11/1990 | Davison | |
| 4,978,207 A | 12/1990 | Gillner et al. | |
| 5,032,099 A | 7/1991 | Chan | |
| 5,228,879 A | 7/1993 | Fromm | |
| 5,310,377 A | 5/1994 | Joja | |
| 5,453,915 A | 9/1995 | Bradley, III | |
| 6,030,085 A | 2/2000 | Leam et al. | |
| 6,084,527 A | 7/2000 | Spector | |
| 6,116,983 A | 9/2000 | Long et al. | |
| 6,120,155 A | 9/2000 | Brennan et al. | |
| 6,183,335 B1 | 2/2001 | Petersen | |
| 6,319,087 B1 | 11/2001 | Ferrigno | |
| 6,354,708 B1 | 3/2002 | Monahan et al. | |
| 6,478,435 B2 | 11/2002 | Monahan et al. | |
| 6,491,403 B2 | 12/2002 | Edgar | |
| 6,736,694 B2 | 5/2004 | Hornsby et al. | |
| 6,857,753 B2 | 2/2005 | Kane | |
| 6,948,999 B2 * | 9/2005 | Chan | 446/219 |

\* cited by examiner

*Primary Examiner*—Mark A. Robinson
(74) *Attorney, Agent, or Firm*—Carter Schnedler & Monteith, P.A.

(57) ABSTRACT

A combination mirror and amusement system for entertaining and amusing a child in a vehicle. A mirror assembly attachable to a vehicle seat includes a mirror and a frame surrounding the mirror. The frame has at least one ornamented portion and at least one appearing character portion. The appearing character portion in turn includes a sheet of plastic film having a visible front side and a reverse side. The sheet of plastic film has the characteristic of a "one-way" mirror which appears as a mirrored surface on the front side in the absence of illumination from the reverse side. A character image is printed on the reverse side A lamp behind the reverse side renders the character image visible from said front side when illuminated.

16 Claims, 10 Drawing Sheets

LIGHT AND SOUND MIRROR ASSEMBLY WITH APPEARING CHARACTERS

CROSS-REFERENCE TO RELATED APPLICATIONS

This is a continuation-in-part of U.S. non-provisional patent application Ser. No. 10/412,649, filed Apr. 10, 2003, which in turn claims the benefit of U.S. provisional patent applications Ser. No. 60/371,329, filed Apr. 10, 2002, and Ser. No. 60/372,228, filed Apr. 12, 2002. In addition, the benefit of U.S. provisional patent application Ser. No. 60/567,101, filed Apr. 30, 2004 is claimed.

BACKGROUND OF THE INVENTION

The invention relates to mirrors used inside a vehicle for observing an infant in a rear-facing car seat secured to the rear seat of a motor vehicle.

Mirror devices of the general type described are disclosed, for example, in the following U.S. patents: Cossey U.S. Pat. No. 4,702,572; Masucci U.S. Pat. No. 4,712,892; Erickson U.S. Pat. No. 4,733,956; Harris U.S. Pat. No. 4,902,118; Gardner U.S. Pat. No. 4,909,618; Lumbra et al. U.S. Pat. No. 5,103,347; and Nolan-Brown U.S. Pat. No. 5,285,321. A particular mirror attachment system is disclosed in Kane U.S. Pat. No. 6,857,753.

Very briefly, in such devices, a mirror is mounted or attached near the top of the rear seat of a motor vehicle in such a way that the driver of the vehicle, by looking in the rear view mirror, can observe an infant in a safety seat of the type in which the infant is positioned facing the rear of the vehicle.

SUMMARY OF THE INVENTION

In one aspect, a combination mirror and amusement system for viewing an infant in a rear-facing child safety seat located in the rear seat of a motor vehicle utilizing the rear view mirror of the vehicle, as well as for entertaining and amusing the infant, is provided. The system includes a mirror assembly attachable to a rear vehicle seat. The mirror assembly in turn includes a mirror for observing the infant and a frame surrounding the mirror. The frame has at least one appearing character portion. The appearing character portion in turn includes a sheet of plastic film having a visible front side and a reverse side. The sheet of plastic film has the characteristic of a "one-way" mirror which appears as a mirrored surface on the front side in the absence of illumination from the reverse side. A character image is printed on the reverse side A lamp behind the reverse side renders the character image visible from said front side when the lamp is illuminated.

In another aspect, combination mirror and amusement system for entertaining and amusing a child in a vehicle is provided. The system includes a mirror assembly attachable to a vehicle seat. The mirror assembly in turn includes a mirror and a frame surrounding the mirror. The frame has at least one appearing character portion. The appearing character portion in turn includes a sheet of plastic film having a visible front side and a reverse side. The sheet of plastic film has the characteristic of a "one-way" mirror which appears as a mirrored surface on the front side in the absence of illumination from the reverse side. A character image is printed on the reverse side A lamp behind the reverse side renders the character image visible from said front side when the lamp is illuminated.

DETAILED DESCRIPTION

Figure 1:
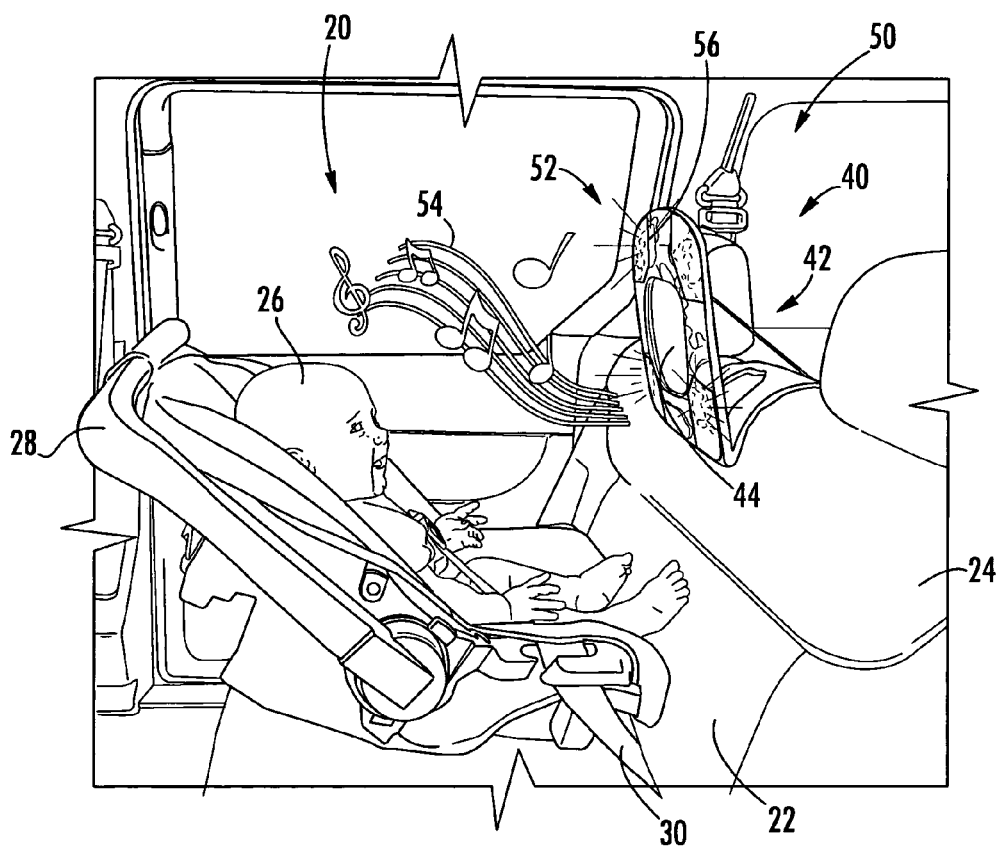
FIG. 1 shows a combination mirror and amusement system in use in the rear seating area of a vehicle.

Referring first to FIG. 1, a rear seating area 20 of a vehicle is represented, including a rear seat 22 having a seatback 24. An infant 26 secured within a child car safety seat 28, in turn secured to the rear seat 22 by a seatbelt 30. A mirror assembly 40 is attached to the rear seat 22, in particular the seatback 24 thereof, by an attachment generally designated 42. Any one of a variety of attachment systems may be employed, such as the attachment system disclosed in Kane U.S. Pat. No. 6,857,753. Several configurations of the attachment 42 are described hereinbelow with reference to FIGS. 8-13.

The mirror assembly 40 includes a mirror 44 for viewing the infant utilizing the rear view mirror 46 (FIG. 2) of the vehicle in a well known manner. In addition, the mirror assembly 40 includes an amusement device, generally designated 50, and described in detail hereinbelow. Briefly the amusement device 50 includes a sound generator generally designated 52 (FIGS. 5-7) which produces sounds a represented by symbol 54 for amusing and entertaining the infant 26. The sounds can be a plurality of melodies or tunes selected to delight and stimulate the infant 26. The amusement device 50 additionally includes an appearing character system, generally designated 56, also described in detail hereinbelow. On the front of the mirror assembly 40 is an OFF/ON/CHARACTERS & SOUNDS control switch 58 connected for controlling the amusement device 50.

Figure 2:
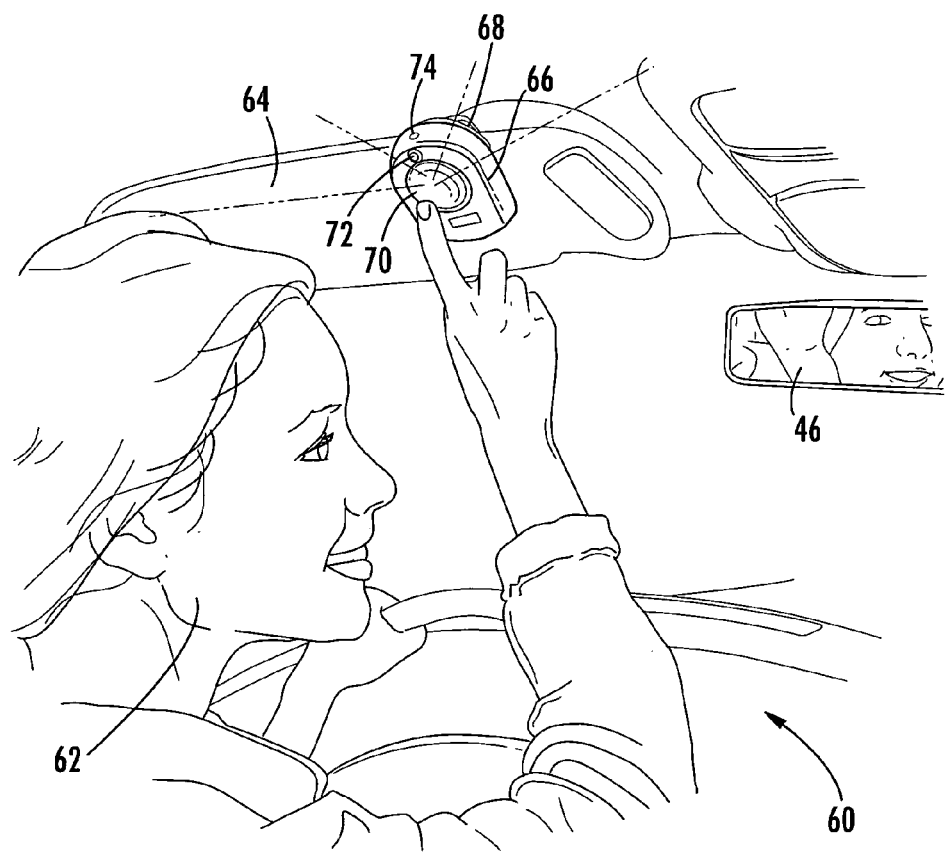
FIG. 2 shows a remote control transmitter unit located in the front seating area of the vehicle.

FIG. 2 illustrates a front seating area 60 of the vehicle, in which an adult 62 is seated. Easily accessible by the adult 62, for example attached to a visor 64, is a battery-power remote control transmitter unit 66. The transmitter unit 66 has an attachment clip 68 on its rear side. On the front of the transmitter unit 66 is a push button 70 and an operation indicator LED 72 which assures a user the transmitter 66 is activated, as well an infrared (IR) emitter 74 which emits a coded signal in a conventional manner.

Correspondingly, a remote control receiver generally designated 80 is included in the mirror assembly 40, and is connected for activating the amusement device 50 when the OFF/ON/CHARACTERS & SOUNDS control switch 58 is in its CHARACTERS & SOUNDS position.

Figure 3:
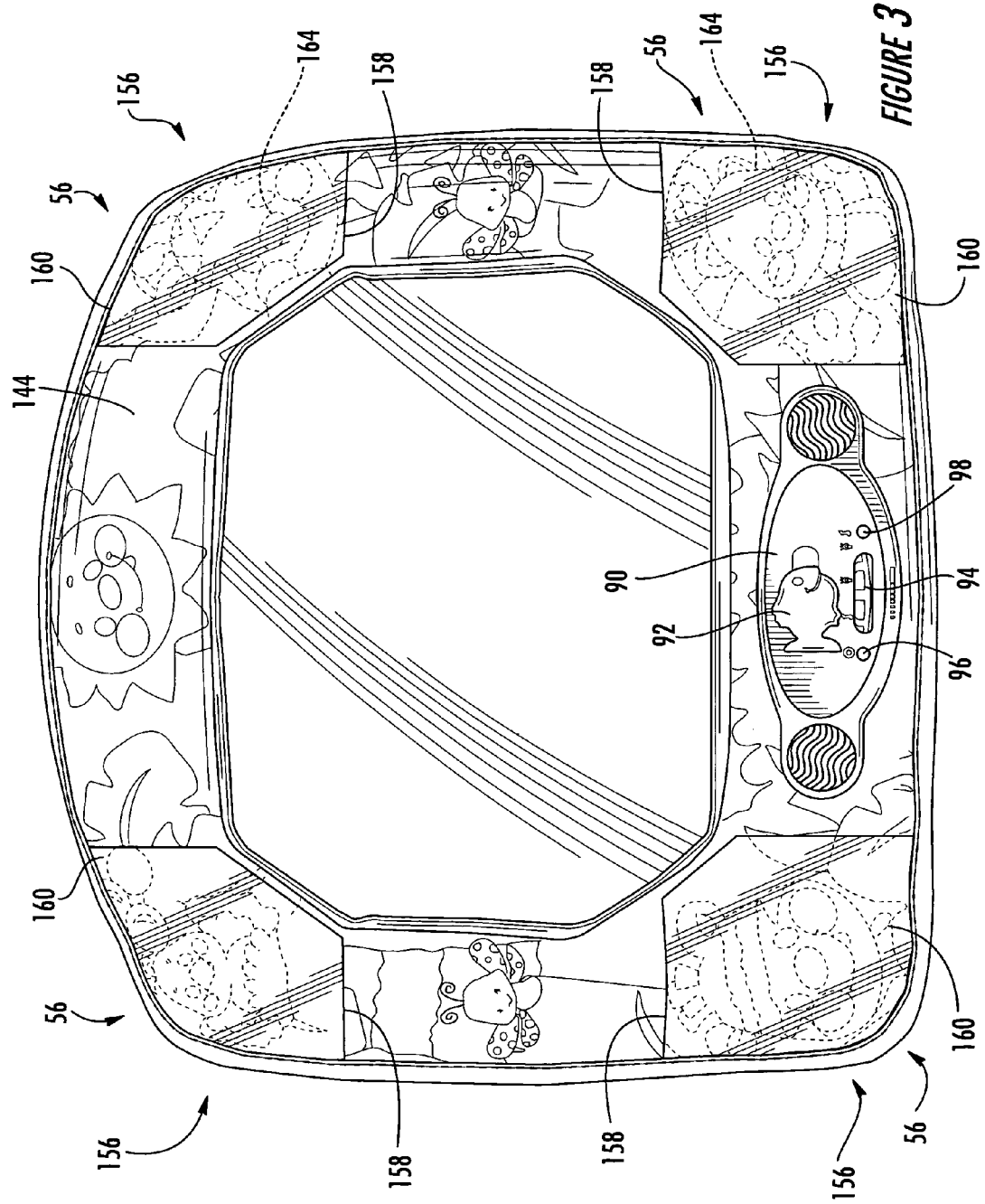
FIG. 3 is a front view of the mirror assembly.

Referring in addition to the front elevational view of FIG. 3, on the front of the mirror assembly 40 is a control panel 90 supporting a three-position slide switch actuator 92 in the shape of decorative fish head as well as a volume control knob 94 in the form of a thumb wheel or disk, the edge of which is visible in FIG. 3. On the left side of the thumb wheel 94 is a red LED 96 which illuminates to indicate the amusement device 50 is turned on and ready to receive signals from the transmitter unit 66. To the right of the thumb wheel 94 is an infrared (IR) receiver 98 for receiving coded signals from the infrared emitter 72 in the transmitter unit 66.

When the slide switch activator 92 is all the way to the left, the amusement device 50 is turned completely off, and the indicator LED 96 is dark. In any other position, the LED 96 illuminates to indicate the amusement device 50 of the mirror assembly 40 is ON and ready to receive an activating signal from the transmitter unit 66. When the slide switch activator 92 is moved to the right, the amusement device 50 is selected. When a signal is received from the transmitter unit 66, the sound generator 52 plays music and the appearing character system 56 is activated. The sound generator 52 and the appearing character system 56 are deactivated upon receipt of a second signal from the transmitter unit 66.

Figure 4:
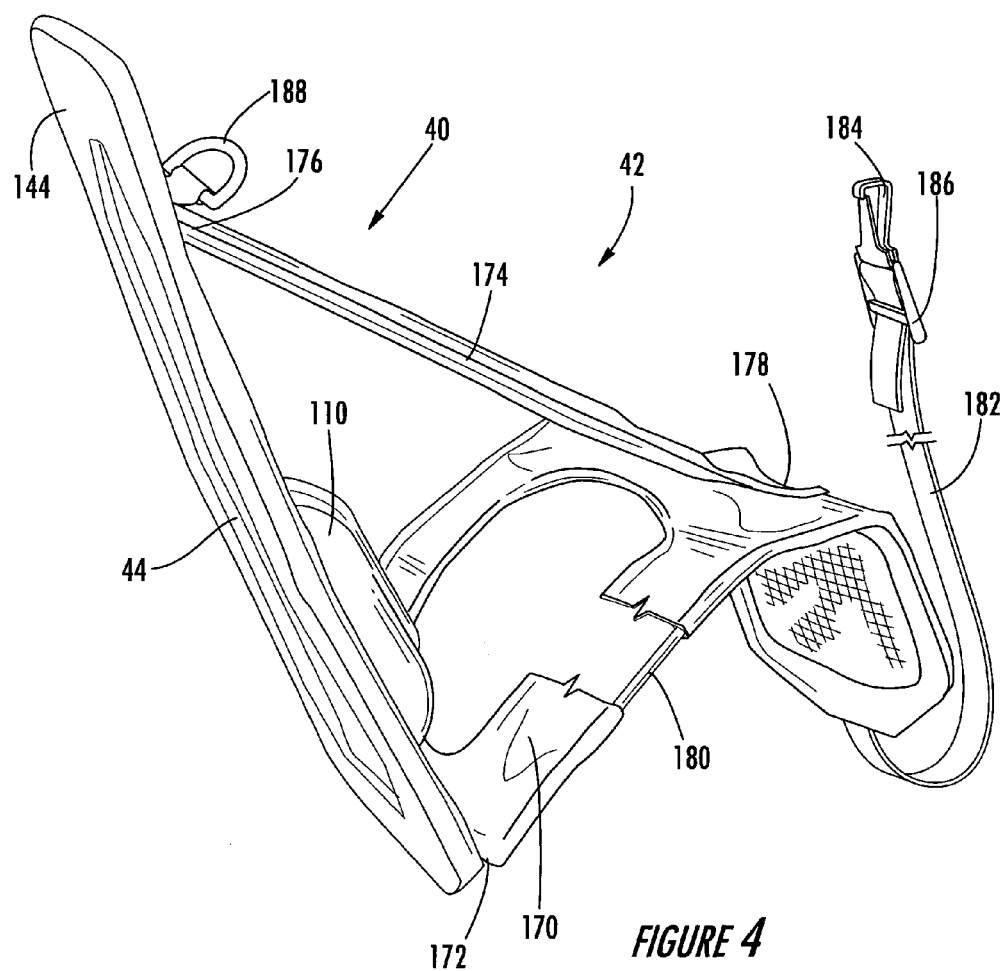
FIG. 4 is a three-dimensional side view of the mirror assembly, also depicting a representative attachment.
Figure 5:
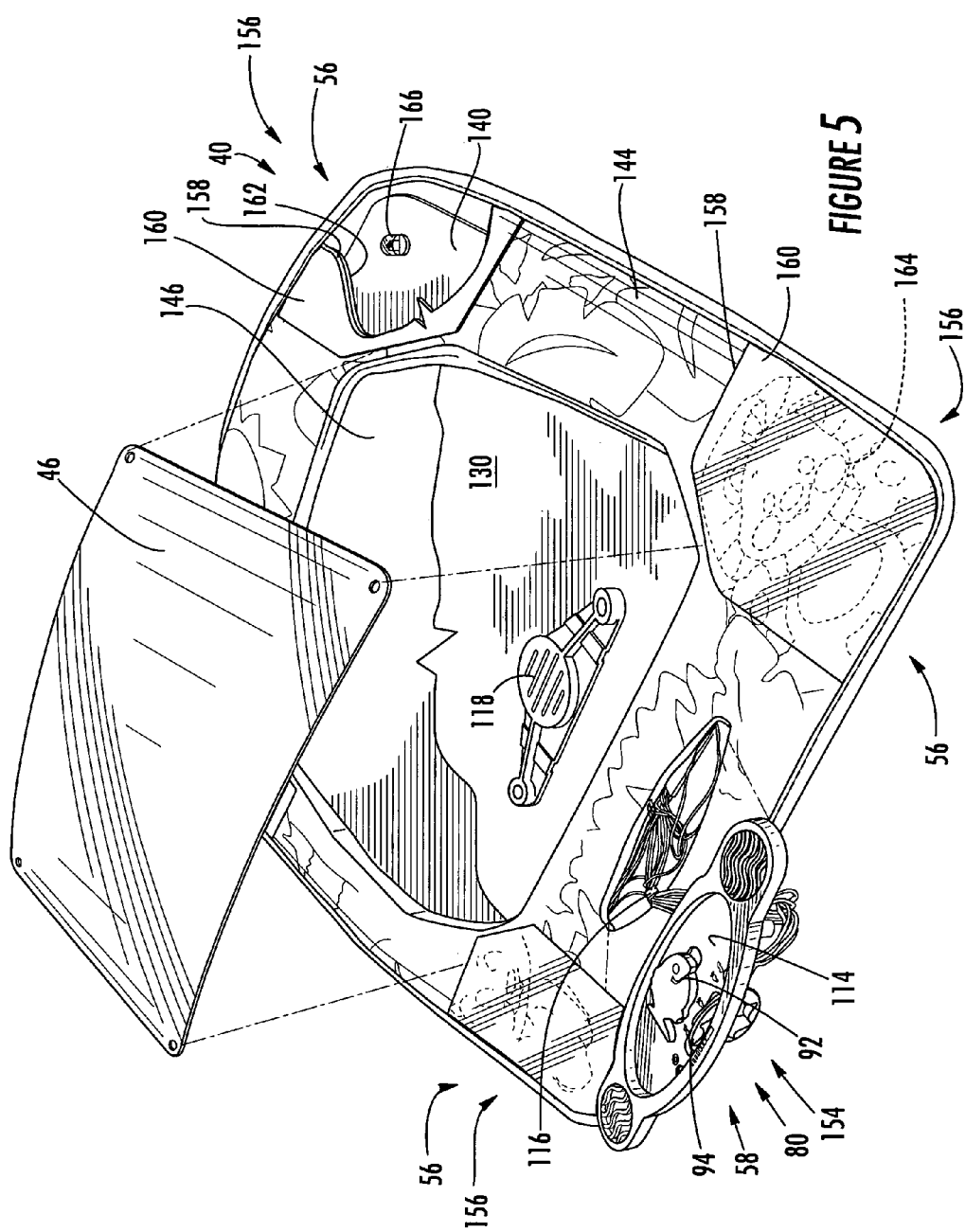
FIG. 5 shows the mirror assembly partially disassembled.
Figure 6:
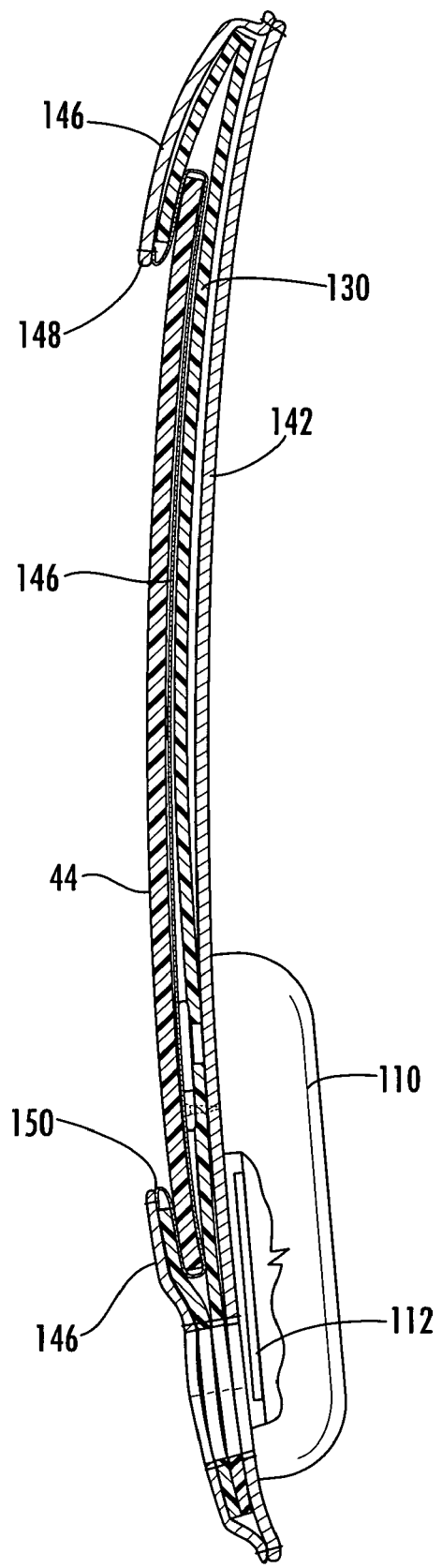
FIG. 6 is a cross-sectional side view of the mirror assembly.

FIG. 4 is a three-dimensional side view of the mirror assembly 40 and the representative attachment 42, the use of which is described in detail hereinbelow with reference to FIGS. 8-13. On the rear side of the mirror assembly 40 is an electronics compartment 110 containing batteries as well as electronic components mounted on a printed circuit board 112 (FIG. 6). As shown in the partially disassembled view of FIG. 5, another printed circuit board 114 is attached to the hidden side of the control panel 90, and interconnected by wires. Also visible in FIG. 5 is a speaker 118, comprising an element of the sound generator 52.

Figure 7:
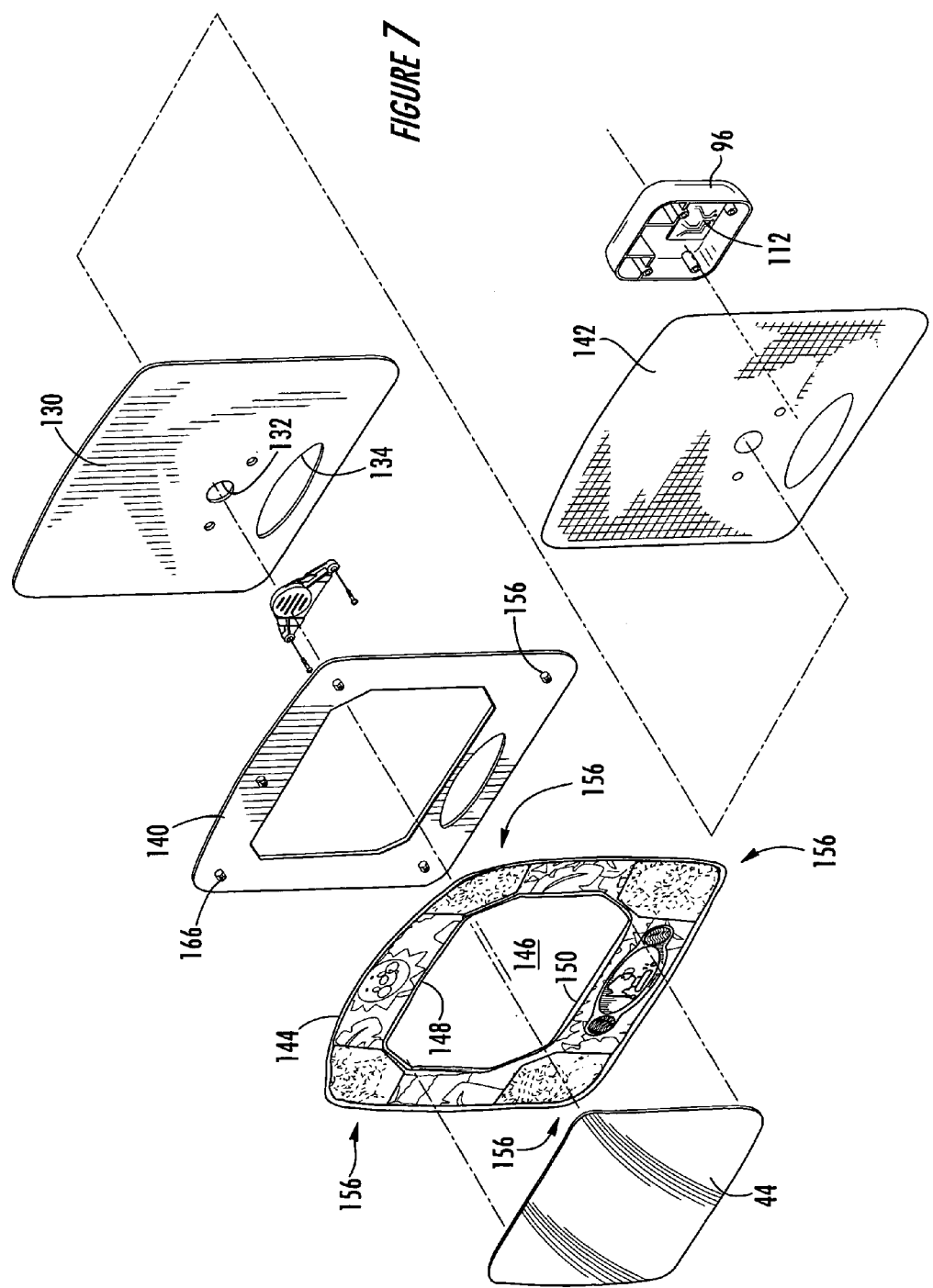
FIG. 7 is an exploded view of the mirror assembly.

With reference to the cross sectional view of FIG. 6 and the exploded view of FIG. 7, internally, the mirror assembly 40 includes a sheet-like plastic core 130 including an aperture 132 for mounting the speaker 118, and an oval aperture 134 for mounting the control panel 90 (FIG. 3) in communication with components within the electronics compartment 110.

Attached near the periphery of the plastic core 130 is a resilient plastic retaining frame 140. The plastic core 130 and the retaining frame 140 are surrounded by fabric, in particular, a rear fabric panel 142, and an ornamented front frame 144 with a loosely-fitting front fabric panel 146 extending between inner edges 148 and 150 of the ornamented front frame 144. The mirror 66 is held in place behind the retaining frame 140.

The sound generator 52 of the amusement device 50 includes a conventional sound circuit carried by the printed circuit board 112, the speaker 118, as well as control switching elements carried by the printed circuit board 114 on the back of the control panel 90, including a volume control element 154 connected to the thumb wheel 94. When selected by the OFF/ON/CHARACTERS & SOUNDS control switch 58 and activated via the transmitter unit 66 and the IR receiver 98, the sound generator 52 plays melodies or tunes to entertain the infant.

The appearing character system 56 in overview presents what appear to be simple mirrored surfaces which transform to present characters when activated. In other words, characters appear where there was previously a simple mirrored surface, and accordingly entertain the infant 26. To an infant, this may seem to be "magic."

The appearing character system 56 more particularly takes the form of at least one, and preferably a plurality, of appearing character portions 156 which are portions of the otherwise-ornamented front frame 144. In the illustrated embodiment the appearing character portions 156 are located in the corners of the otherwise-ornamented front frame 144. Each of the appearing character portions includes a sheet 158 of plastic (e.g. mylar) film having a visible front side 160 and a reverse side 162 (FIG. 5). The sheet 58 of plastic (mylar) film has the characteristic of a half-silvered or "one-way" mirror which appears as a mirrored surface on the front side 160 in the absence of illumination from the reverse side 162. A character image 164 is printed on the reverse side 162. In addition, there is a lamp 166, such as an LED 166 (FIG. 5), behind the reverse side 162 which renders the character image 164 visible from the front side 160 when the LED 166 is illuminated.

When the appearing character system 56 is activated, the individual lamps 166 or LEDs 166 illuminate in a sequence to render corresponding character images 164 visible in sequence. Circuitry (not shown) to effect this function is included within the electronics compartment 110.

Referring again to the attachment 42 of FIG. 4, a fabric base 170 is attached by sewing at 172 to the lower edge of the mirror assembly 40. An adjustable stand 174 having a thin plastic core to provide a degree of rigidity is sewn at 176 to an upper portion of the rear of the mirror assembly 40. At its lower end 178, the adjustable stand 174 has the "hook" element of a hook and loop fastener for adjustable attachment at any location along the base 170.

Sewn into the base 170 around the periphery thereof in the manner of a wire frame is a piece of malleable wire 180 that can be easily bent to form the base 170 into a suitable attachment configuration, widely adaptable to a variety of seatback shapes and configurations. The base 170 including the malleable wire 180 comprises what may be viewed as an adjustable clamp.

At the tail end of the base 170 a tether strap 182 is attached, terminating in a hook 184 with an adjustable buckle 186. A D-ring attachment 188 is located on the back of the mirror assembly 40, generally in the same position as where the stand 174 is sewn 176 to the mirror assembly 40.

Referring finally to FIGS. 8-13, five different attachment configurations are illustrated, as are briefly described next below.

Figure 8:
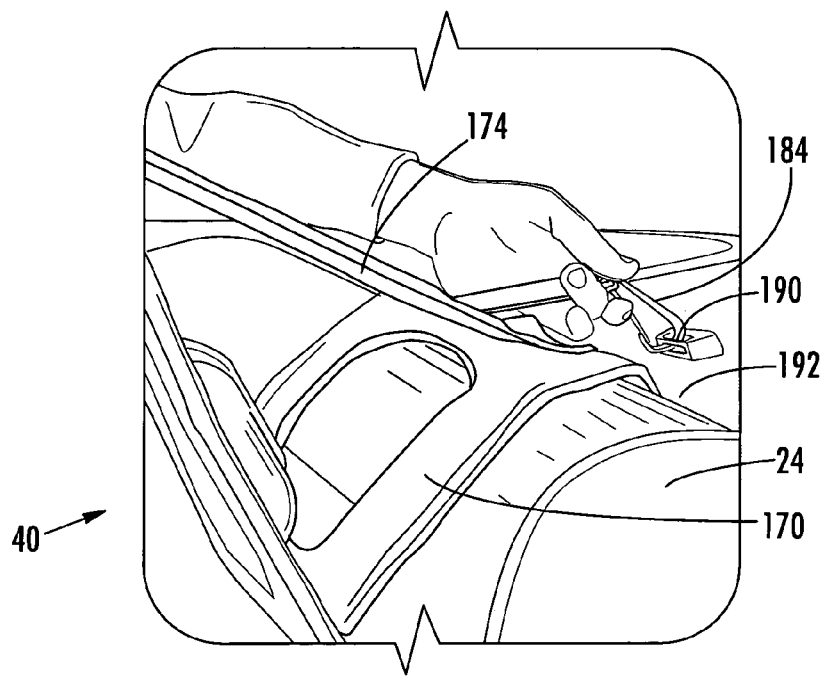
FIG. 8 illustrates the mirror assembly in a tether attachment configuration.

FIG. 8 discloses a tether anchor attachment, in which a top tether anchorage point 190 is employed. Such top tether anchorage points 190 are included in newer vehicles. In the FIG. 8 attachment configuration, the mirror assembly 40 is placed on the seatback 24, the attachment base 170, with its malleable wire frame 180, is bent to conform to the shape of the seatback 24, and inserted between the seatback 24 and the rear deck 192 as required. The hook 184 of the tether strap 182 is attached to the top tether anchor 190, and the buckle 186 is adjusted so that the mirror assembly 40 is firm against the seatback 24. The mirror 44 is positioned employing the adjustable stand 174 so that the infant 26 is visible to the adult driver 62 in the rear view mirror 46.

Figure 9:
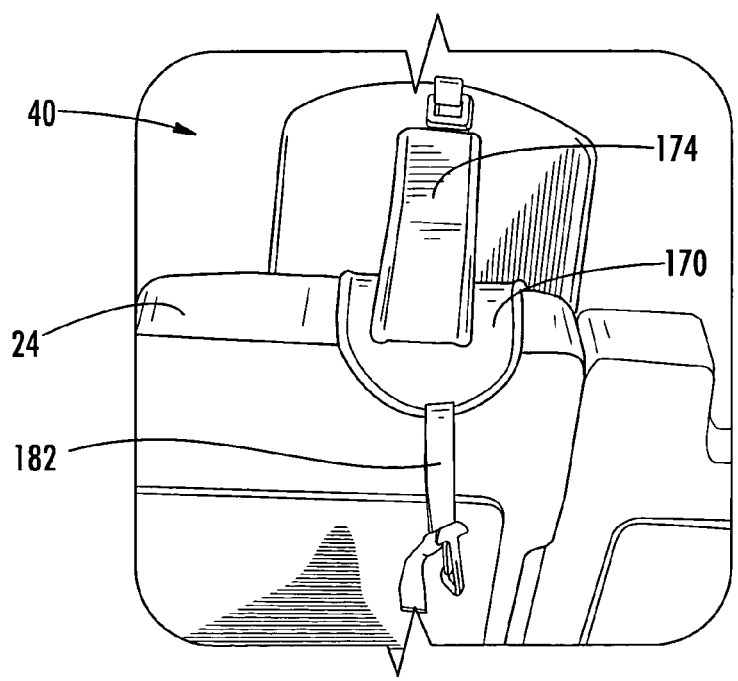
FIGS. 9 and 10 illustrate the mirror assembly in a center backseat attachment for bench seats configuration.
Figure 10:
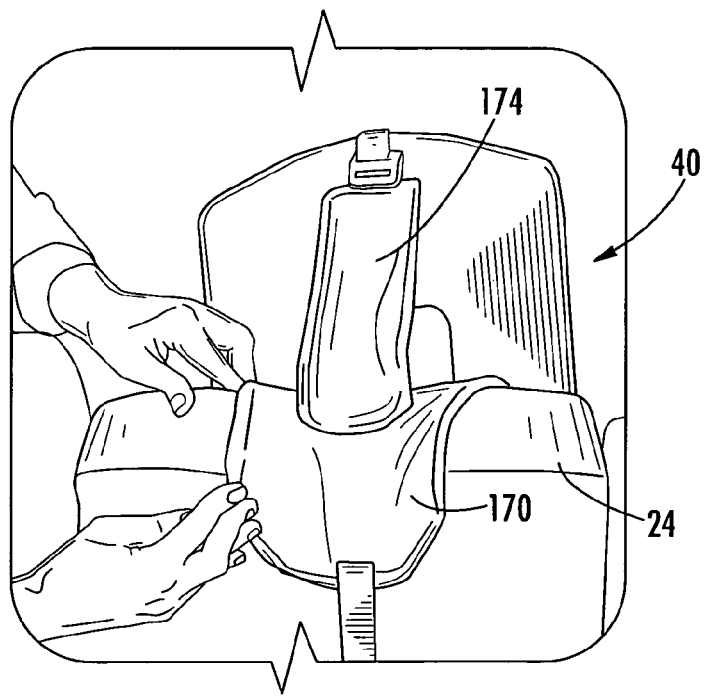

FIGS. 9 and 10 illustrate a center back seat attachment configuration for bench seats. The mirror assembly 40 is positioned on the seatback 24. The attachment base 170 with its malleable wire frame 180 is bent so as to conform to the shape of the seatback 24 (FIG. 10), and adjusted for a tight, secure fit. The mirror 44 is positioned employing the adjustable stand 174 so that the infant 26 is visible to the adult driver 62 in the rear view mirror 46.

Figure 11:
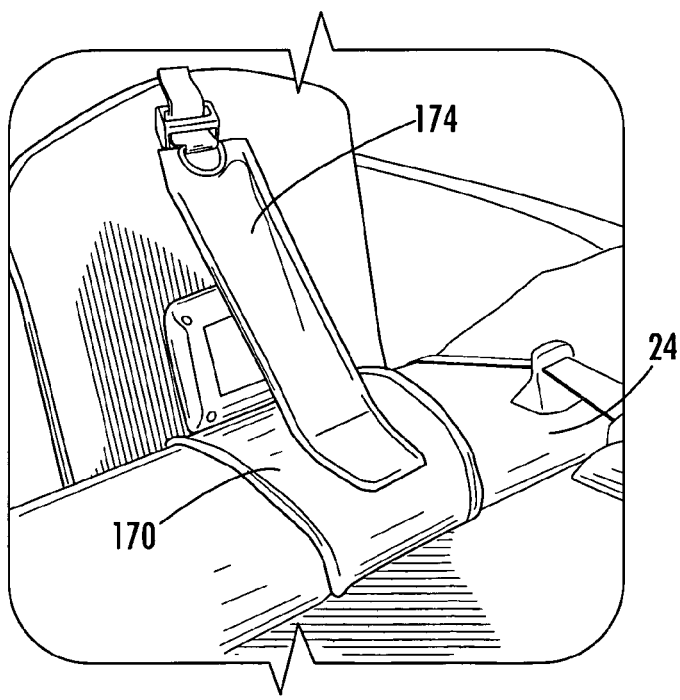
FIG. 11 illustrates the mirror assembly in a center backseat with rear deck attachment configuration.

FIG. 11 illustrates a center back seat with rear deck attachment configuration. The mirror assembly 40 is positioned on the seatback 24. The attachment base 170 with its malleable wire frame 180 is bent so as to conform to the seatback, and inserted between the seatback and rear deck 192 as required. The mirror 44 is positioned employing the adjustable stand 174 so that the infant 26 is visible to the adult driver 62 in the rear view mirror 46.

Figure 12:
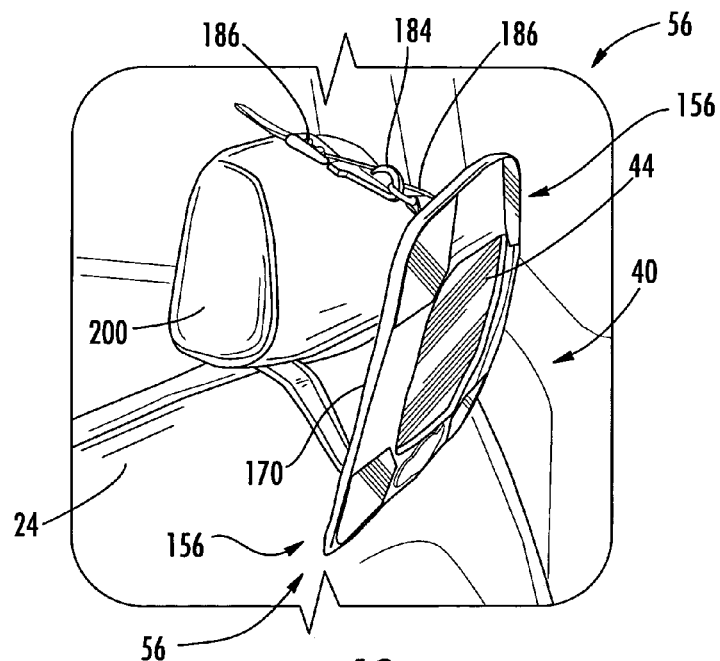
FIG. 12 illustrates the mirror assembly in a backseat headrest attachment configuration.

FIG. 12 illustrates a back seat headrest attachment configuration. The headrest 200 is lifted up, and the attachment base 170 with its malleable wire frame 180 serving as a clamp is inserted underneath the headrest 200. The attachment base 170 is bent to conform to the shape of the seat, as described hereinabove with reference to FIG. 10. Still referring to FIG. 12, the headrest 200 is pushed down to secure the attachment base 170, and the tether strap 182 is wrapped around the headrest 200, and the hook 184 is attached to the D-ring 186.

Figure 13:
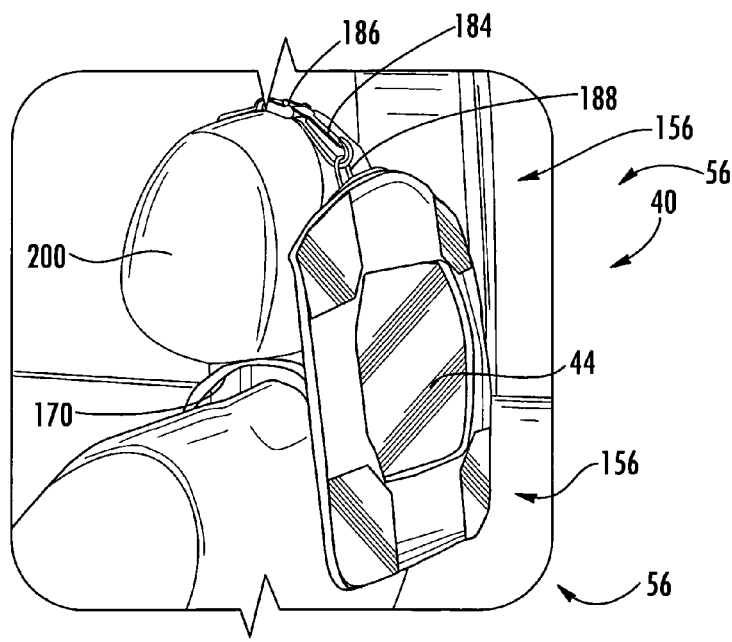
FIG. 13 illustrates the mirror assembly in an attachment configuration for forward-facing children.

Finally, FIG. 13 illustrates an attachment configuration for entertaining (but not viewing) forward-facing children. In a manner similar to that described hereinabove with reference to FIG. 12, the headrest 200 is lifted up, and the attachment base 170 with its malleable wire frame 180 (FIG. 4) comprising a clamp is inserted underneath the headrest 200, and bent to conform to the seat shape as described hereinabove with reference to FIG. 10. Referring again to FIG. 13, the headrest 200 is pushed down to secure the attachment base 170. The tether strap 182 is inserted underneath the headrest 200, over the top of the headrest 200, and attached to the D-ring 188. The strap 182 (FIG. 4) and buckle 186 are adjusted so that a child can see him or herself in the mirror 44.

While a particular embodiment of the invention has been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A combination mirror and amusement system for viewing an infant in a rear-facing child safety seat located in the rear seat of a motor vehicle utilizing the rear view mirror of the vehicle, as well as for entertaining and amusing the infant, said system comprising:
    a mirror assembly attachable to a rear vehicle seat, said mirror assembly including
        a mirror for observing the infant,
        a frame surrounding said mirror, said frame including at least one ornamented portion and at least one appearing character portion,
        said appearing character portion in turn comprising
            a sheet of plastic film having a visible front side and a reverse side, said sheet of plastic film having the characteristic of a "one-way" mirror which appears as a mirrored surface on the front side in the absence of illumination from the reverse side,
            a character image printed on the reverse side, and
            a lamp behind the reverse side which renders said character image visible from said front side when said lamp is illuminated.

2. The system of claim 1, wherein said mirror assembly additionally includes a sound generator.

3. The system of claim 1, which further comprises:
    a remote control transmitter unit; and
    a remote control receiver included in said mirror assembly and connected for activating at least said appearing character portion.

4. The system of claim 1, which further comprises an OFF/ON/CHARACTERS & SOUNDS control switch included in said mirror assembly and connected for controlling at least said appearing character portion.

5. The system of claim 4, which further comprises:
    a remote control transmitter unit; and
    a remote control receiver included in said mirror assembly and connected for activating at least said appearing character portion when said OFF/ON/CHARACTERS & SOUNDS control switch is in an ON position.

6. The system of claim 1, wherein said frame includes a plurality of appearing character portions each comprising a character image and a corresponding lamp, and wherein individual lamps of said plurality of appearing character portions illuminate in a sequence to render corresponding character images visible in sequence.

7. The system of claim 6, which further comprises an OFF/ON/CHARACTERS & SOUNDS control switch included in said mirror assembly and connected for controlling at least said appearing character portion.

8. The system of claim 7, which further comprises:
    a remote control transmitter unit; and
    a remote control receiver included in said mirror assembly and connected for activating at least said appearing character portion when said OFF/ON/CHARACTERS & SOUNDS control switch is in an ON position.

9. A combination mirror and amusement system for entertaining and amusing a child in a vehicle, said system comprising:
    a mirror assembly attachable to a vehicle seat, said mirror assembly including
        a mirror,
        a frame surrounding said mirror, said frame including at least one ornamented portion and at least one appearing character portion,
        said appearing character portion in turn comprising
            a sheet of plastic film having a visible front side and a reverse side, said sheet of plastic film having the characteristic of a "one-way" mirror which appears as a mirrored surface on the front side in the absence of illumination from the reverse side,
            a character image printed on the reverse side, and
            a lamp behind the reverse side which renders said character image visible from said front side when said lamp is illuminated.

10. The system of claim 9, wherein said mirror assembly additionally includes a sound generator.

11. The system of claim 9, which further comprises:
    a remote control transmitter unit; and
    a remote control receiver included in said mirror assembly and connected for activating at least said appearing character portion.

12. The system of claim 9, which further comprises an OFF/ON/CHARACTERS & SOUNDS control switch included in said mirror assembly and connected for controlling at least said appearing character portion.

13. The system of claim 12, which further comprises:
    a remote control transmitter unit; and
    a remote control receiver included in said mirror assembly and connected for activating at least said appearing character portion when said OFF/ON/CHARACTERS & SOUNDS control switch is in an ON position.

14. The system of claim 9, wherein said frame includes a plurality of appearing character portions each comprising a character image and a corresponding lamp, and wherein individual lamps of said plurality of appearing character portions illuminate in a sequence to render corresponding character images visible in sequence.

15. The system of claim 14, which further comprises an OFF/ON/CHARACTERS & SOUNDS control switch included in said mirror assembly and connected for controlling at least said appearing character portion.

16. The system of claim 15, which further comprises:

a remote control transmitter unit; and
a remote control receiver included in said mirror assembly and connected for activating at least said appearing character portion when said OFF/ON/CHARACTERS & SOUNDS control switch is in an ON position.

* * * * *